3,565,914
PROCESS FOR CYCLIZING FORMANILIDES
Harry Louis Yale, New Brunswick, and Ervin Richard Spitzmiller, Edison, N.J., assignors to E. R. Squibb & Sons, Inc., New York, N.Y., a corporation of Delaware
No Drawing. Filed Mar. 13, 1969, Ser. No. 807,089
Int. Cl. C07d 87/54, 93/42
U.S. Cl. 260—327                                      9 Claims

ABSTRACT OF THE DISCLOSURE

An improved process for cyclizing certain formanilides results when the reaction is carried out in either diethylbenzene, diphenyl ether or a mixture of diphenyl ether and biphenyl.

BRIEF SUMMARY OF THE INVENTION

This invention relates to an improved process for producing the ring system (I)
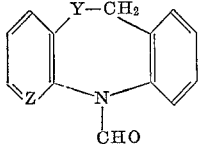

wherein Z is C–H or nitrogen and Y is oxygen or sulfur. This ring system, which may include substituents on either one or both of the benzene rings, provides an intermediate for the synthesis of compounds in which there is an aminoalkylene chain on the nitrogen atom.

The invention particularly concerns the cyclization of a formanilide of the formula (II)
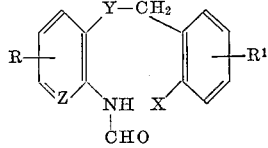

wherein X is halogen, preferably chlorine or bromine and especially the latter, Y is oxygen or sulfur, Z is C–H or nitrogen and R and $R^1$ each is hydrogen, halogen, trifluoromethyl, lower alkyl, lower alkoxy, trifluoromethylmercapto, trifluoromethoxy or N,N-dimethylsulfonamido, especially the first three, to form a 5,11-dihydrodibenz[b,e][1,4]oxazepine, 5,11 - dihydrodibenz[b,e][1,4] thiazepine, 5,11 - dihydro - 6 - azadibenz[b,e][1,4]oxazepine or 5,11 - dihydro - 6 - azadibenz[b,e][1,4]thiazepine of the formula (III)
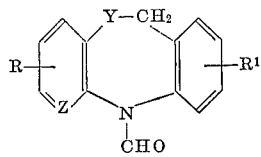

wherein the symbols have the same meaning as above. These compounds are intermediates for the synthesis of products shown in U.S. Patents 3,069,432, Dec. 18, 1962, 3,123,614, Mar. 3, 1964, or 3,188,322, June 8, 1965.

It has been found that the cyclization of a compound of Formula II to the tricyclic compound of Formula III occurs in greatly increased yield and improved quality of product when either diethylbenzene, diphenyl ether, or a mixture of diphenyl ether and biphenyl is used as the reaction medium.

DETAILED DESCRIPTION OF THE INVENTION

According to the prior procedures for cyclizing the formanilide of Formula II as in the patents referred to above, a basic reagent such as potassium carbonate or sodium carbonate in N,N-dimethylformamide, N,N-dimethylacetamide or nitrobenzene solvent at elevated temperature is used. A catalytic amount of copper has also been proposed. These methods provide variable yields of the dihydrodibenzoxazepine, dihydrodibenzothiazepine, azadihydrodibenzoxazepine or azadihydrodibenzthiazepine. The products, moreover, are difficult to isolate, especially from unconverted starting materials, and contain colored impurities.

In the case of the N,N-dimethylformamide frequently used, some cyclization may occur but highly colored deep purple resins are formed simultaneously and it is not possible to isolate, in good yield, the 5-carboxaldehyde derivative from the reaction mixture. It is usually advisable to saponify the crude deep purple product with aqueous alcoholic alkali to give the 5-unsubstituted heterocycle (IV):

(IV)
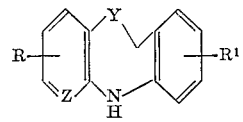

A tedious procedure is still essential to separate IV from the deep purple resinous by-products.

It has now been found that by using either diethylbenzene, diphenyl ether, or a mixture of diphenyl ether with biphenyl as the reaction medium or solvent, much improved yields of cyclized product are obtained, e.g., 80% or better (based on open formanilide compound of Formula II) and the isolation and purification of the cyclized product is greatly simplified. The reaction product crystallizes from the reaction mixture in a high state of purity since the reaction mixture remains colorless, and the yields are high.

According to this invention, the formanilide of Formula II is dissolved in anhydrous diethylbenzene, diphenyl ether, or a mixture of diphenyl ether with biphenyl. Technical grade or better of these materials is preferred. A mixture of diphenyl ether with biphenyl is used which contains a major proportion of diphenyl ether, i.e., in excess of 50% diphenyl ether. Preferred is a eutectic mixture containing approximately 73% diphenyl ether and 27% of biphenyl which is available commercially under the trade name Dowtherm A.

According to this invention a dilute solution of the formanilide of Formula II in one of the solvents described is formed, preferably a solution of approximately 1% to 10% (weight/volume) concentration, and most preferably 3 to 7%. Preferably then about 4.8 to 20.0 parts by weight of potassium carbonate and about 0.1 to 1.0 parts by weight of copper are added. The mixture may then be heated for about 1 to 5 hours at an internal temperature in the range of about 150 to 170° C. At the completion of the reaction the mixture is filtered and the filtrate is concentrated, e.g., by distillation or on a rotary evaporator under vacuum, to obtain the product.

The following examples are illustrative of the invention. All temperatures are on the centigrade scale.

EXAMPLE 1

A mixture of 0.014 mole of the open formanilide of the formula

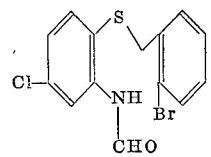

100 ml. of Dowtherm A (a eutectic mixture of diphenyl ether and biphenyl), 9.5 g. of anhydrous micronized potassium carbonate, and 0.4 g. copper bronze powder are heated at 165–170° for two hours, filtered hot through a filter mat, and the filtrate concentrated to drynes in vacuo. The residual material is stirred with diethyl ether and filtered to give 90% yield of 7-chloro-5,11-dihydro dibenzo[b,e][1,4]thiazepine-5-carboxaldehyde of excellent quality, M.P. 163–165°.

EXAMPLE 2

The procedure of Example 1 is followed except that the same amount of diethylbenzene is substituted for the Dowtherm A and the mixture is heated at 160–165°. The same product of excellent quality is obtained in 80% yield, M.P. 163–165°.

EXAMPLE 3

The procedure of Example 1 is followed except that the same amount of diphenyl ether is substituted for the Dowtherm A. The same product of good quality is obtained in 89% yield, M.P. 160–163°.

EXAMPLE 4

The procedure of Example 1 is followed except that the same amount of 2-(o-bromobenzyloxy)formanilide is substituted as starting material and the mixture is heated at 160–165°. 5,11-dihydrodibenz[b,e][1,4]oxazepine-5-carboxaldehyde of excellent quality is obtained in 87% yield, M.P. 98–101°.

EXAMPLE 5

The procedure of Example 1 is followed except that the same amount of 2-(o-bromobenzyloxy)-5-trifluoromethylformanilide is substituted as starting material and the mixture is heated 160–165°. 7-trifluoromethyl-5,11-dihydrodibenz[b,e][1,4]oxazepine-5-carboxaldehyde of excellent quality is obtained in quantitative yield, M.P. 107–111°.

EXAMPLE 6

The same procedure as in Example 5 carried out in diethylbenzene gives the same product in 80% yield.

EXAMPLE 7

The procedure of Example 1 is followed except that the same amount of 2-(o-bromobenzyloxy)-5-chloroformanilide is substituted as starting material and the mixture is heated at 160–165°. The product, 7-chloro-5,11-dihydro dibenz[b,e][1,4]oxazepine-5-carboxaldehyde, of excellent quality is obtained in quantitative yield, M.P. 116–118°.

EXAMPLE 8

The procedure of Example 1 is followed except that the same amount of 2-(o-bromo-p-chlorobenzyloxy)-5-chloroformanilide is substituted as starting material, diethylbenzene is substituted for the Dowtherm A and the mixture is heated at 160–165°. The product, 3,7-dichloro-5,11-dihydrodibenz[b,e][1,4]oxazepine-5-carboxaldehyde, of good quality is obtained in 80% yield, M.P. 124–129°.

EXAMPLE 9

The procedure of Example 1 is followed except that the same amount of 2'-(o-bromobenzoyloxy)-3'-formamidopyridine is used as starting material and the mixture is heated at 155–160°. The product, 5,11-dihydro-6-azadibenzo[b,e][1,4]oxazepine-5-carboxaldehyde, [which may also be named as 5,10-dihydropyrido[3,2b][4,1]benzoxazepine-5-carboxaldehyde], of excellent quality is obtained in 92% yield, M.P. 116–118°.

EXAMPLE 10

The same procedure of Example 9 in diethylbenzene gives a 93% yield of the same product of excellent quality.

EXAMPLE 11

The same procedure of Example 1 is followed using 2-(o-bromobenzylmercapto)-5-trifluoromethylformanilide to give 7-trifluoromethyl-5,11-dihydrodibenzo[b,e][1,4]-thiazepine-5-carboxaldehyde of good quality in good yield.

EXAMPLE 12

The same procedure of Example 1 is followed substituting the same amount of 2-(o-bromo-p-chlorobenzyloxy)formanilide as starting material and the mixture is heated at 160–165°. The product, 3-chloro-5,11-dihydrodibenz[b,e][1,4]oxazepine-5-carboxaldehyde, of excellent quality is obtained at 80% yield, M.P. 88–90°.

What is claimed is:
1. A process for cyclizing a formanilide of the formula.

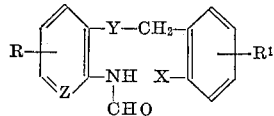

wherein X is halogen, Y is oxygen or sulfur, Z is C—H or nitrogen and R and R¹ each is hydrogen, halogen, lower alkyl, lower alkoxy, trifluoromethyl, trifluoromethylmercapto, trifluoromethoxy or N,N-dimethyl-sulfonamido, which comprises forming a dilute solution of said formanilide in diethylbenzene, diphenyl ether or a mixture of diphenyl ether with biphenyl in a concentration of about 1 to 10% (wieght/volume), heating the reaction mixture at a temperature in the range of about 150° to 170° C. and isolating the cyclized product.

2. A process as in claim 1 wherein X is bromine, Y is sulfur, Z is C—H and R and R¹ each is hydrogen.

3. A process as in claim 1 wherein X is bromine, Y is oxygen, Z is C—H and R and R¹ each is hydrogen.

4. A process as in claim 1 wherein X is bromine, Y is oxygen, Z is nitrogen and R and R¹ each is hydrogen.

5. A process as in claim 1 wherein the reaction solvent is a eutectic mixture of diphenyl ether with biphenyl.

6. A process which comprises heating at a temperature in the range of about 150° to 170° C. a solution of about 1 to 10% (weight/volume) of 2-(o-bromobenzylmercapto)-5-chloroformanilide in diethylbenzene, diphenyl ether or a mixture of diphenyl ether with biphenyl, in the presence of about 4.8 to 20.0 parts by weight of potassium carbonate and about 0.1 to 1.0 parts by weight of copper, and isolating 7-chloro-5,11-dihydrodibenzo[b,e][1,4] thiazepine-5-carboxaldehyde.

7. A process as in claim 1 wherein X is bromine, Y is oxygen, Z is C—H, R is chloro and R¹ is hydrogen.

8. A process as in claim 1 wherein X is bromine, Y is oxygen, Z is C—H, R is trifluoromethyl and R¹ is hydrogen.

9. A proces as in claim 1 wherein X is bromine, Y is oxygen, Z is C—H, R is hydrogen and R¹ is chloro.

References Cited

UNITED STATES PATENTS

| | | | | |
|---|---|---|---|---|
| 3,069,432 | 12/1962 | Yale | | 260—333 |
| 3,123,614 | 3/1964 | Yale | | 260—296 |
| 3,188,322 | 6/1965 | Yale | | 260—327 |

HENRY R. JILES, Primary Examiner

C. M. SHURKO, Assistant Examiner

U.S. Cl. X.R.

260—294.8, 296, 333